(12) United States Patent
Senatori (10) Patent No.: US 8,936,072 B2
(45) Date of Patent: Jan. 20, 2015

(54) THERMAL DISTRIBUTION SYSTEMS AND METHODS

(75) Inventor: Mark David Senatori, The Woodlands, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 952 days.

(21) Appl. No.: 12/814,114

(22) Filed: Jun. 11, 2010

(65) Prior Publication Data

US 2011/0303393 A1    Dec. 15, 2011

(51) Int. Cl.
H01L 23/467 (2006.01)
G06F 1/20 (2006.01)
H05K 7/20 (2006.01)

(52) U.S. Cl.
CPC .......... *G06F 1/203* (2013.01); *G06F 2200/201* (2013.01)
USPC ..................... 165/104.34; 165/122

(58) Field of Classification Search
CPC ............. H01L 23/467; H05K 7/20009; H05K 7/20145; G06F 1/203; G06F 2200/201
USPC ............. 165/80.3, 104.33, 122, 908, 104.34; 361/690, 695
See application file for complete search history.

(56) References Cited

U.S. PATENT DOCUMENTS

| | | | |
|---|---|---|---|
| 4,628,992 A * | 12/1986 | Kennedy | 165/123 |
| 4,997,034 A * | 3/1991 | Steffen et al. | 165/104.34 |
| 5,493,473 A * | 2/1996 | Yanagi | 361/695 |
| 6,172,871 B1 | 1/2001 | Holung et al. | |
| 6,219,234 B1 * | 4/2001 | Sammakia et al. | 361/695 |
| 6,599,090 B2 * | 7/2003 | Ozaki et al. | 415/206 |
| 6,842,340 B2 * | 1/2005 | Chang | 361/695 |
| 6,909,602 B2 | 6/2005 | Dietrich et al. | |
| 7,606,027 B2 * | 10/2009 | Takasou | 361/695 |
| 7,643,284 B2 * | 1/2010 | Nakamura | 361/679.47 |
| 2003/0214782 A1 * | 11/2003 | Osborn et al. | 361/687 |
| 2004/0042171 A1 | 3/2004 | Takamatsu et al. | |
| 2006/0011330 A1 * | 1/2006 | Wang | 165/122 |
| 2008/0158817 A1 * | 7/2008 | Tsunoda et al. | 361/697 |
| 2009/0010757 A1 * | 1/2009 | Hwang et al. | 415/204 |
| 2009/0147476 A1 * | 6/2009 | Han | 361/697 |
| 2009/0168346 A1 * | 7/2009 | Miyoshi | 361/695 |
| 2009/0279247 A1 * | 11/2009 | Chen et al. | 361/679.47 |

FOREIGN PATENT DOCUMENTS

TW    307784 Y    3/2007

* cited by examiner

*Primary Examiner* — Tho V Duong (57) ABSTRACT

Thermal distribution systems and methods are provided. A thermal distribution system can include a first surface having a perimeter and a second surface. At least a portion of the perimeter can be disposed proximate the second surface, forming a void between the first and second surfaces. The first surface can include a plurality of perforations. The second surface can include at least a portion of an electronic enclosure. A fluid mover having a first inlet can be adapted to draw a first inlet fluid from inside the void.

17 Claims, 6 Drawing Sheets

THERMAL DISTRIBUTION SYSTEMS AND METHODS

BACKGROUND OF THE INVENTION

Description of the Related Art

Portable electronic devices continue to grow in popularity to the point of ubiquitousness. Along with the growing popularity of tablet computers, portable computers, cellular devices, and handheld gaming systems, comes an increasing popular demand to both shrink the size and improve the performance and responsiveness of the device. In response to these requirements, designers have wrapped higher and higher performing electronic products in smaller and smaller packages. Such designs however suffer from the tendency for high performance devices to generate considerable quantities of heat, which in a smaller device, can raise the internal temperature of the device to levels capable of impacting the performance or life of the electronic components disposed within the device.

BRIEF DESCRIPTION OF THE DRAWINGS

Advantages of one or more disclosed embodiments may become apparent upon reading the following detailed description and upon reference to the drawings in which.

DETAILED DESCRIPTION

Heat is generated by heat producing electronic components, such as central processing units ("CPUs") and graphical processing units ("GPUs") used in most portable electronic devices such as slate computers, laptop computers, netbooks, handheld gaming devices, and handheld cellular devices. The heat generated by such components must be removed or otherwise dissipated to minimize the performance impact to the portable electronic device. Given the ever decreasing size of portable electronic device housings, heat removal becomes a significant undertaking. Facilitating or otherwise improving the flow of a cooling fluid around and about all heat producing components within the electronic device can improve the performance of the device and prolong the life of the electronic components. Distributing the heat from the heat generating components and transferring the distributed heat into the cooling fluid are therefore of paramount importance.

A thermal distribution system is provided. The system can include a first surface and a second surface. At least a portion of a perimeter of the first surface is disposed proximate the second surface forming a void. The first surface can include a plurality of perforations and the second surface can include at least a portion of an electronic enclosure. The system can also include a fluid mover having a first inlet adapted to draw a first inlet fluid from inside the void disposed proximate the first surface.

A thermal distribution method is also provided. The method can include reducing the pressure within a void formed by disposing at least a portion of a perimeter of a first surface proximate a second surface. The first surface can include a plurality of perforations and the second surface can include at least a portion of an electronic enclosure. The method can further include warming a fluid flowing about a heat producing device disposed at least partially within the electronic enclosure and drafting at least a portion of the warm fluid into the reduced pressure void via the plurality of perforations disposed on the first surface.

Figure 1A:
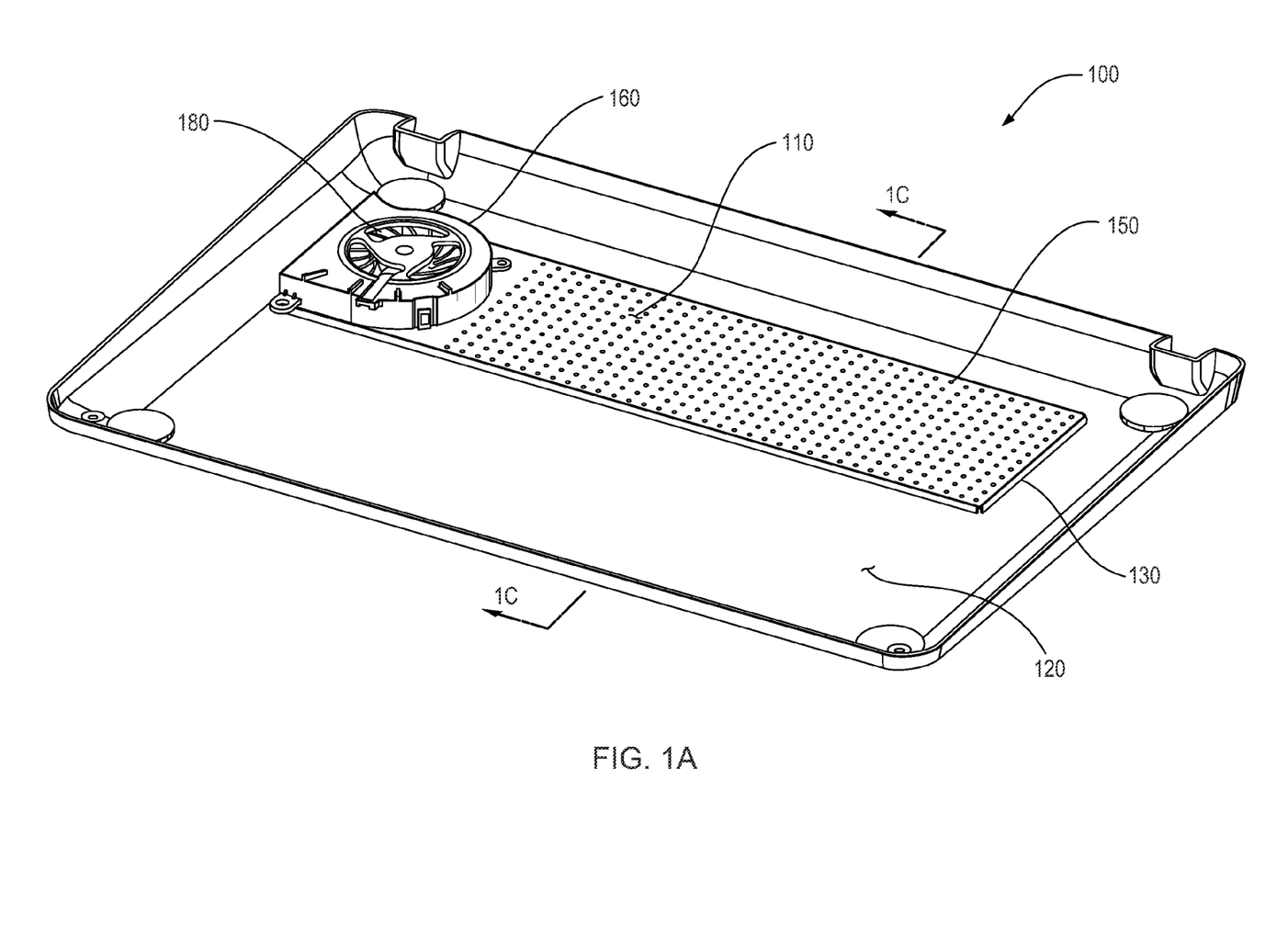
FIG. 1A is a perspective view depicting an illustrative thermal distribution system, according to one or more embodiments described herein.
Figure 1B:
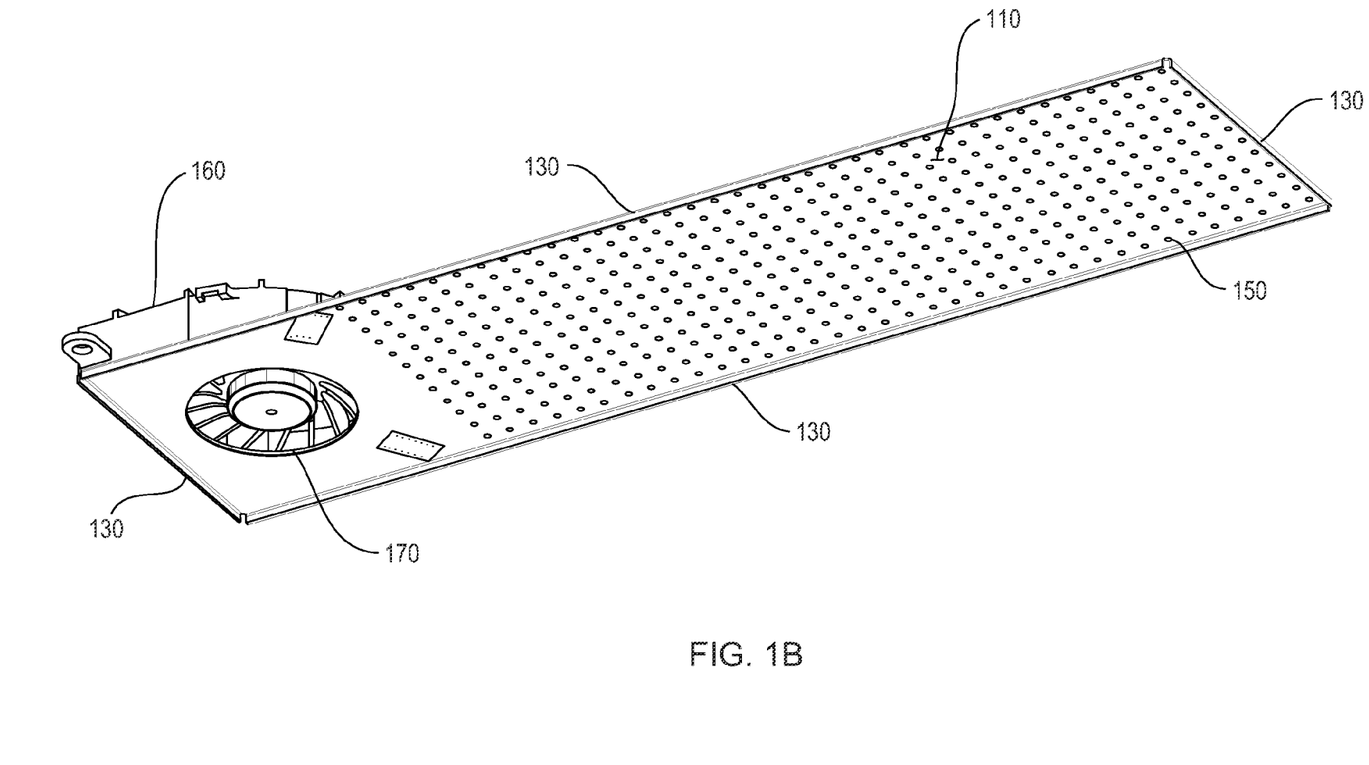
FIG. 1B is a lower perspective view depicting an illustrative thermal distribution surface as depicted in FIG. 1A, according to one or more embodiments described herein.
Figure 1C:
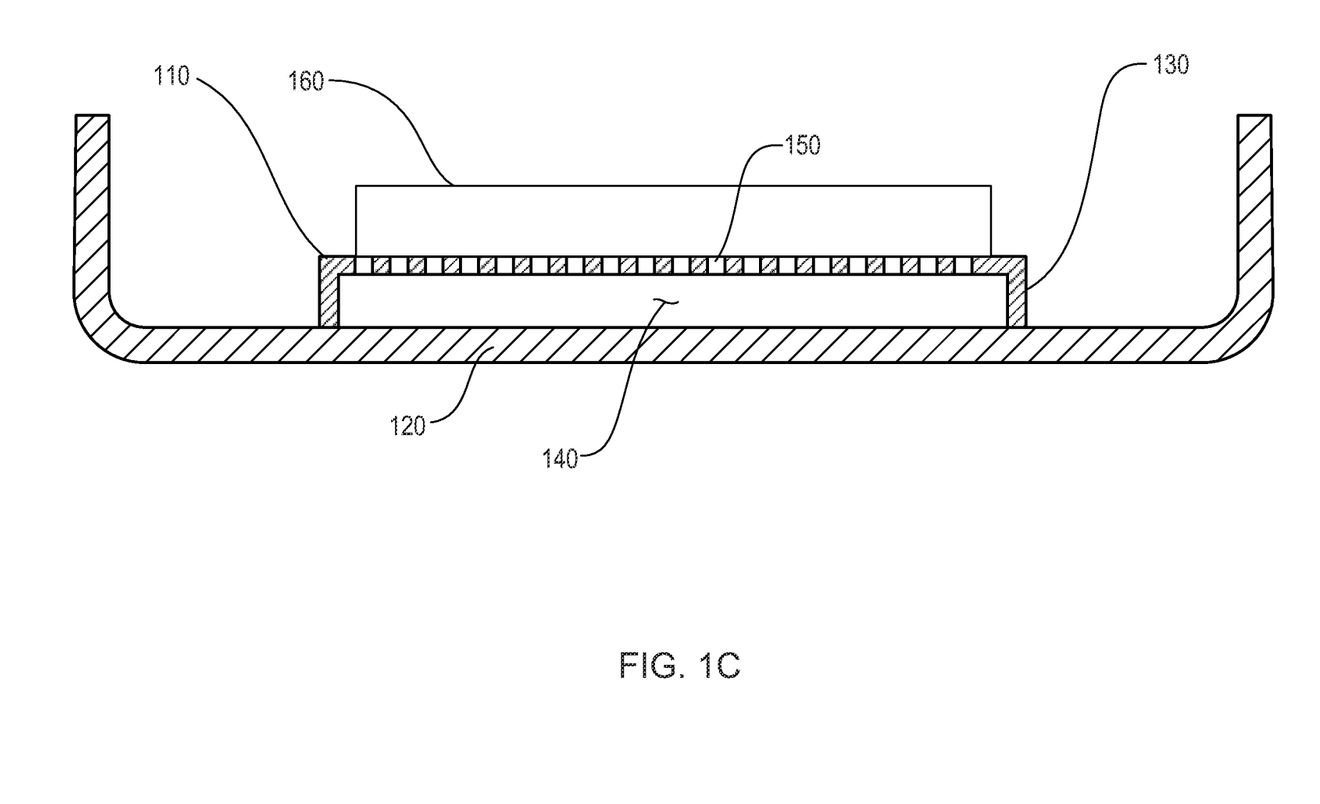
FIG. 1C is a sectional view depicting the illustrative thermal distribution system depicted in FIG. 1A along section line 1C-1C, according to one or more embodiments described herein.

For clarity and ease of discussion, FIGS. 1A, 1B, and 1C depict an illustrative thermal distribution system and will be discussed in detail as a group. FIG. 1A is a perspective view depicting an illustrative thermal distribution system 100, according to one or more embodiments. FIG. 1B is a lower perspective view depicting an illustrative first surface 110 as depicted in FIG. 1A, according to one or more embodiments. FIG. 1C is a sectional view depicting the illustrative thermal distribution system 100 depicted in FIG. 1A along section line 1C-1C, according to one or more embodiments.

The thermal distribution system 100 can include a first surface 110 and a second surface 120. The first surface 110 can be defined by a perimeter 130. At least a portion of the perimeter 130 can be disposed proximate the second surface 120 to form a void 140 between the first and second surfaces 110, 120. The void 140 formed between the first and second surfaces 110, 120 can extend in whole or in part across the first surface 110, the second surface 120, or both the first and second surfaces 110, 120.

A plurality of perforations 150 can be disposed across all or a portion of the first surface 110. In some embodiments, the plurality of perforations 150 may not extend to the perimeter 130, as depicted in FIGS. 1A-1C. A fluid mover 160 having a first fluid inlet 170 and a second fluid inlet 180 can be disposed proximate the first surface 110. The first fluid inlet 170 can be disposed proximate an aperture within the first surface 110 to provide a first inflow from the fluid within the void 140. The second fluid inlet 180 can be disposed distal from the first surface 110 to provide a second inflow from the fluid external to the void 140.

In at least some embodiments, the fluid mover 160 can be disposed proximate the first surface 110. Using such a configuration, the fluid mover 160 can draw a first fluid inflow from within the void 140 via the first fluid inlet 170 and a second fluid inflow from outside the void 140. As the fluid mover 160 draws fluid from the void, a negative pressure can be formed within the void 140 measured with respect to the ambient pressure surrounding the void 140. The negative pressure within the void 140 can induce fluid flow downward through the plurality of perforations 150. The flow of fluid through the plurality of perforations 150 can create a laminar flow boundary layer of fluid within the void 140. Creation of such a boundary layer can improve the transfer of heat through the first surface 110, particularly where the first surface 110 is a thermally conductive material.

The system 100 can include a first surface 110 having a perimeter 130. A plurality of perforations 150 can be disposed in, on, or about the first surface 110 to promote fluid flow through the first surface 110. In some embodiments, the first surface 110 can define a planar structure and the perimeter 130 can be disposed at an angle relative to the plane defined by the first surface 110, for instance the perimeter 130 can be disposed at an angle of about 90° measured with respect to the plane defined by the first surface.

The first surface 110 and the perimeter 130 can, in some embodiments, be the same material, including a thermally conductive material such as aluminum, an aluminum alloy, copper or a copper alloy. The first surface 110 and the perimeter 130 can, in some embodiments, be different materials, for example the first surface can be a relatively rigid, thermally conductive, material such as aluminum, aluminum alloys, copper or copper alloys, while the perimeter can be a relatively soft material having a lower thermal conductivity, for example a high temperature elastomeric material. Where a relatively low thermal conductivity material is used for the perimeter 130, the transmission of heat from the first surface 110 to the second surface 120 can be minimized. Where a relatively soft material is used for the perimeter 130, a positive seal can be formed between the first surface 110 and the second surface 120, improving the thermal performance of the system 100.

The plurality of perforations 150 can include any number of perforations disposed in any pattern or style. The plurality of perforations 150 can include perforations having the same or different sizes. In some embodiments, the plurality of perforations 150 can be arranged based upon the arrangement of one or more heat producing electronic components disposed proximate the first surface, for example perforations can be provided between the electronic components, but not beneath the electronic components. The perforations can be of any shape or size, for example round, square, or rectangular. Where round perforations are used, each can have a diameter of from about 0.05 mm to about 2 mm; about 0.075 mm to about 1.5 mm; or from about 0.1 mm to about 1 mm. Where irregular shaped perforations are used, each can have a cross sectional area of from about 0.002 $mm^2$ to about 3.1 $mm^2$; about 0.004 $mm^2$ to about 1.8 $mm^2$; or about 0.008 $mm^2$ to about 0.8 $mm^2$. In some embodiments, the first surface 110 can be a metal or metal alloy having a thermal conductivity of from about 1 Watt/centimeter-Kelvin (W/cm-K) to about 10 W/cm-K. In some embodiments, the first surface can be a carbon fiber or carbon nanotube structure having a thermal conductivity of from about 1 W/cm-K to about 40 W/cm-K.

In some embodiments, the first surface 110 can be a planar structure having a downturned perimeter 130 disposed at an angle of about 90° measured with respect to the plane formed by the first surface 110. The first surface 110 can be disposed between a heat producing electronic component, for example a central processing unit ("CPU") or graphical processing unit ("GPU") and the second surface 120, such that heat released by the component flows into and through the first surface prior to encountering the second surface 120.

The second surface 120 can be a surface having any size, shape, geometry, or configuration. In some embodiments, the second surface 120 can include all or a portion of an electronic enclosure, for example an electronic enclosure disposed at least partially about a portable electronic device. The first surface 110 can cover the second surface 120 in whole or in part. For example, the first surface 110 can cover about 10% or less; about 30% or less; about 50% or less; about 70% or less; about 90% or less of the second surface 120.

The void 140 formed between the first surface 110 and the second surface 120 can have any size, shape, or physical configuration. In at least some embodiments, the void 140 can be sized to permit the establishment of a laminar flow boundary layer of fluid within the void across all or a portion of the operating range of the fluid mover 160. In some embodiments, one or more standoffs, posts, or pillars can be disposed within the void 140 to provide a uniform void 140 between the first and second surfaces 110, 120. Such standoffs, posts, or pillars, where used, can be variously disposed on or about the first surface 110, the second surface 120, or both the first and second surfaces 110, 120.

Fluid from outside of the void 140 can flow into the void via the plurality of perforations 150 disposed within the first surface 110. Since the perimeter 130 of the first surface 110 can be disposed proximate the second surface 120, additional entry of fluid into the void 140 from sources other than the plurality of perforations 150 can be limited, minimized, or even eliminated where positive sealing occurs about the perimeter 130. Once inside the void 140, the fluid can exit the void via the fluid mover 160. Fluid from within the void can enter the fluid mover 160 via one or more apertures disposed in the first surface 110 proximate the first fluid inlet 170 of the fluid mover 160.

The fluid mover 160 can include any number of devices, systems or combination of systems and devices suitable for inducing an inflow of fluid to one or more inlets and providing an outflow of fluid from one or more discharges. The fluid mover 160 can include one or more fluid movers adapted to move a gas (e.g., a fan), or one or more fluid movers adapted to move a liquid (e.g., a pump). In some embodiments, the fluid mover can have a plurality of fluid inlets, for example a box fan having a first fluid inlet 170 and a second fluid inlet 180 as depicted in FIGS. 1A-1C.

Figure 2:
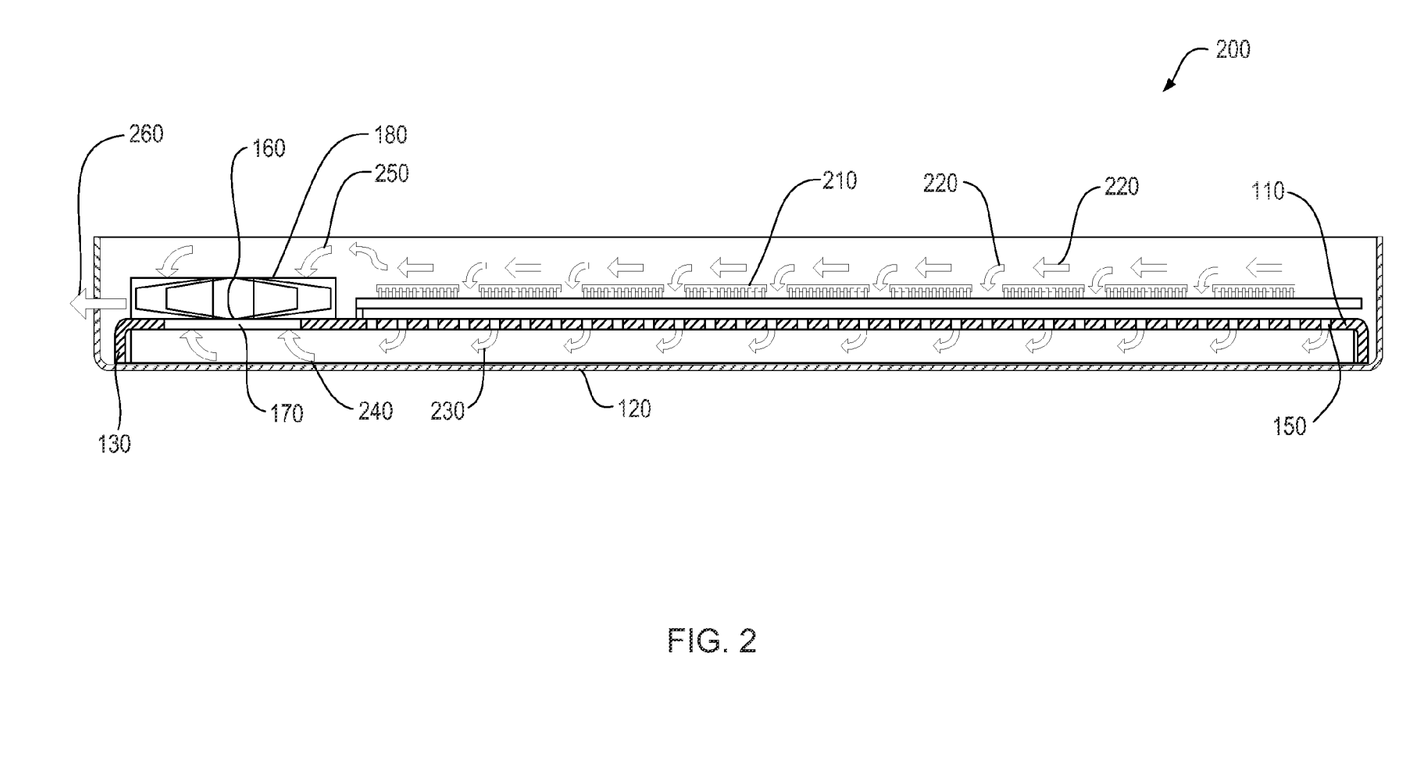
FIG. 2 is a sectional view depicting another illustrative thermal distribution system, according to one or more embodiments described herein.

FIG. 2 is a sectional view depicting another illustrative thermal distribution system 200, according to one or more embodiments. The system 200 can include at least one heat producing electronic component 210 disposed proximate the first surface 110. A fluid can flow 220 about the electronic component 210, a portion 220 of the fluid can flow around or about the electronic component 210.

At least a portion 230 of the fluid can flow through all or a portion of the plurality of perforations 150 and enter the void 140 between the first and second surfaces 110, 120. Once inside the void 140, the fluid 230 can flow or be drafted to the first fluid inlet 170 where the fluid can flow 240 into the fluid mover 160. In a like fashion, at least a portion of the fluid 220 can flow or be drafted to the second fluid inlet 180 where the fluid can flow 250 into the fluid mover 160. The fluid entering the fluid mover 160 can be expelled or otherwise discharged 260 from the fluid mover.

The heat producing electronic component 210 can include any number of components, devices or any combination of systems and devices capable of producing heat as a byproduct of operation. Example heat producing electronic devices 210 can include central processing units ("CPUs"), graphical processing units ("GPUs"), dynamic memory modules (e.g., random access memory or "RAM"), hard disk drives ("HDDs"), solid state drives ("SSDs") and the like. In at least some embodiments, the heat producing electronic component 210 can be disposed on one or more structures such as a printed circuit board or the like. At least a portion of the plurality of perforations 150 can be disposed in a manner such that the perforations are not obstructed by the positioning of the heat producing electrical component 210 or any structure associated therewith.

The fluid flowing about the heat producing electronic components 210 can include any thermal fluid, liquid or gas adapted to remove, transport, or convey at least a portion of the heat generated by the electronic components 210 away from the components. In some embodiments, a gaseous fluid may include, but is not limited to, air. In some embodiments, a liquid fluid may include, but is not limited to, a non-conductive oil. The draft 230 of the fluid into the void 140 can, in some embodiments, create a laminar flow (i.e., a flow having a Reynolds Number of less than 2,000) boundary layer of fluid within the void 140. The draft 230 of the fluid into the void 140 can, in some embodiments, create a transitional flow (i.e., a flow having a Reynolds Number of from about 2,000 to about 20,000) boundary layer of fluid within the void 140. The draft 230 of the fluid into the void 140 can, in some embodiments, create a turbulent flow (i.e., a flow having a Reynolds Number of greater than 20,000) boundary layer of fluid within the void 140.

The first surface 110 can, in some embodiments, be a material having a relatively high thermal conductivity. Through the use of a material having a high thermal conductivity for the first surface 110, localized heating, for instance due to the presence of one or more heat producing electronic components 210, can be distributed across an area larger than the area of the component itself. Such thermal distribution, when combined with the flow of fluid across both the interior 230 and exterior 220 of the void 140, can provide an improved heat transfer and heat removal capacity within the system 200. Improved heat transfer and removal capacity can lower the surface temperature of the system 200 thereby improving user comfort, as well as lowering the temperature of the heat producing components thereby improving component life, performance, and reliability.

Fluid can exit 240 the void 140 via first fluid inlet 170 of the fluid mover 160. In some embodiments, the temperature of the fluid exiting 240 the void can be greater than the temperature of the fluid entering 230 the void. Similarly, fluid can enter 250 the second fluid inlet 180 of the fluid mover 160. Fluid entering the fluid mover 160 can be expelled 260. In some embodiments, the expelled fluid 260 can be directed towards the exterior of the system 200, for example through an exhaust port or similar disposed in, on, or about the system 200.

Figure 3:
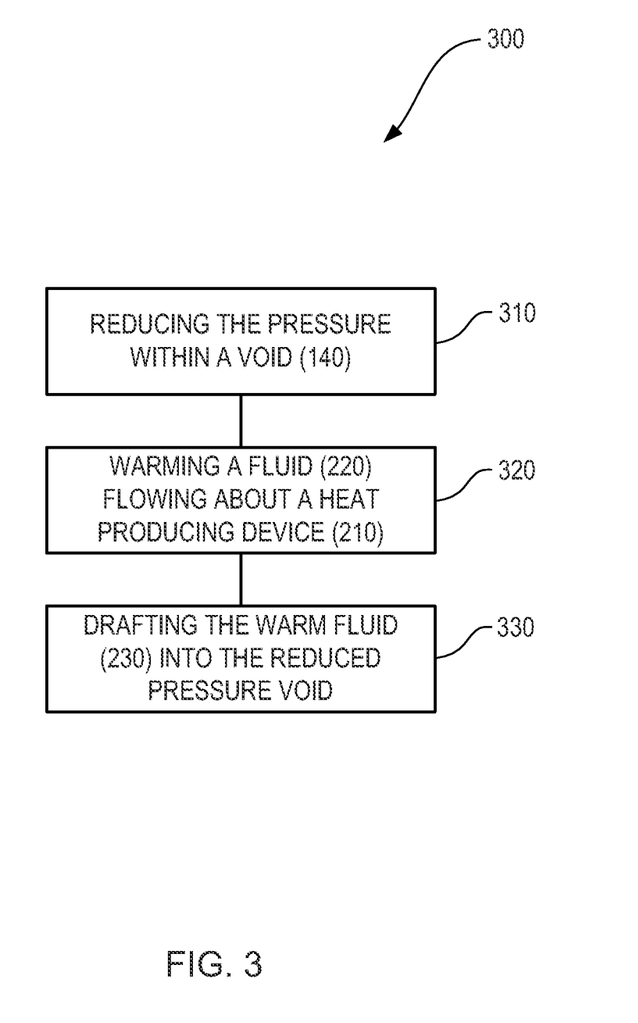
FIG. 3 is a flow diagram depicting an illustrative thermal distribution method, according to one or more embodiments described herein.

FIG. 3 is a flow diagram depicting an illustrative thermal distribution method 300, according to one or more embodiments. The method 300 can include reducing the pressure within a void at 310. The pressure within the void 140 can be reduced below the external pressure of the void by providing an inflow of fluid from the void 140 to a fluid mover 160, for example by providing an inflow of air from the void 140 to a fan 160 as depicted in FIG. 2.

The method can include warming a fluid flowing 220 about a heat producing component 210 at 320. The method can also include drafting the warm fluid 230 into the reduced pressure void via the plurality of perforations 150. In such a manner, the temperature increase of the heat producing electronic components 210 can be limited by flowing a fluid such as air across, about, or around the components. The heated air can then be drawn into the void 140 which is maintained at a reduced pressure by the fan 160.

The flow 230 of air through the void 140 and proximate the first surface 110 can provide additional cooling as a portion of the heat from the component 210 can be transmitted by or through the first surface 110 to the air in the void 140. In some embodiments, the flow rate and volume of fluid 230 through the void 140 can be sufficient to provide a laminar flow regime within the void 140. Such a flow regime can enhance the transfer of heat from the first surface 110 to the fluid flowing 230 within the void 140.

Figure 4:
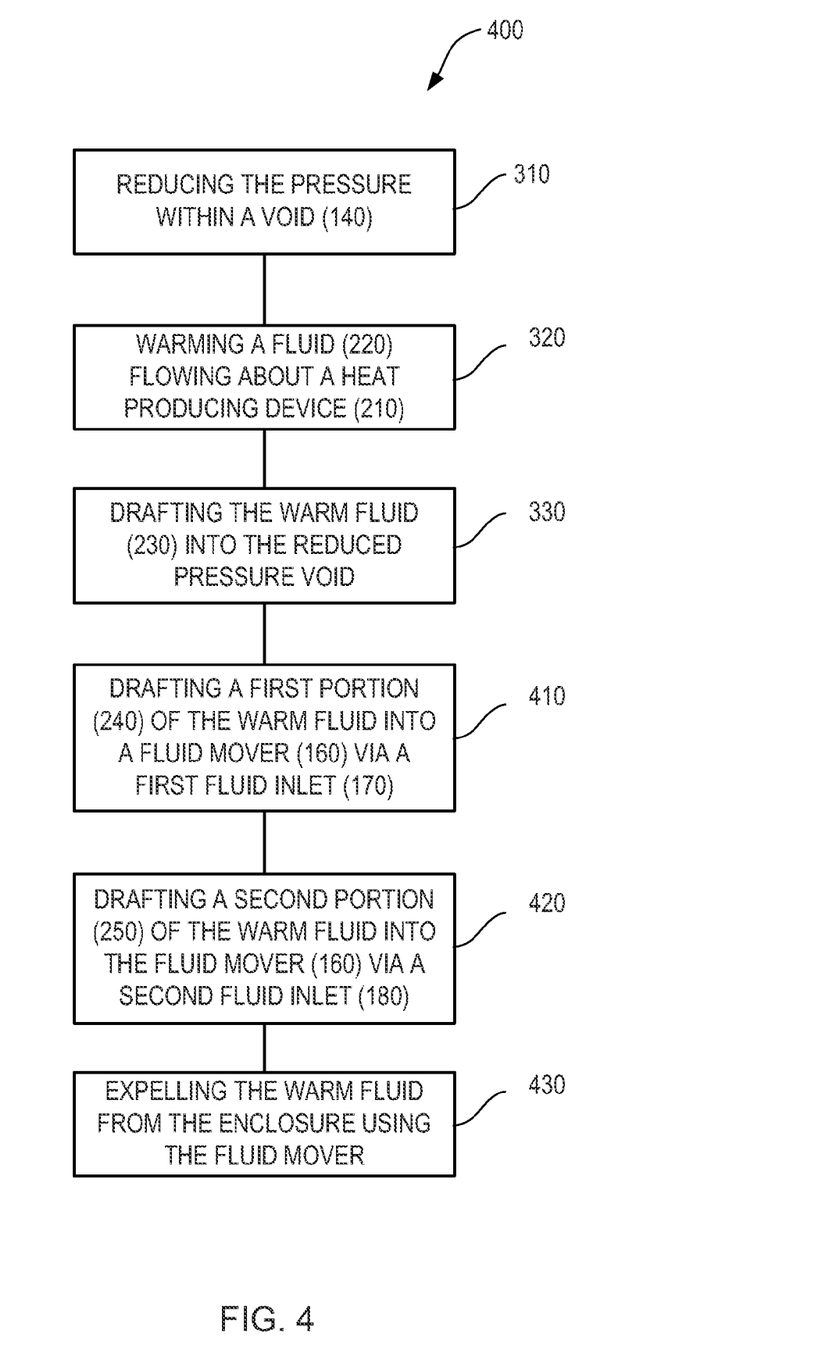
FIG. 4 is a flow diagram depicting another illustrative thermal distribution method, according to one or more embodiments described herein.

FIG. 4 is a flow diagram depicting another illustrative thermal distribution method 400, according to one or more embodiments. In addition to the method described in detail with respect to FIG. 3 above, another thermal distribution method 400 can include drafting at least two portions of warm fluid into the fluid mover: A first portion 240 of the warm fluid can be drafted into the first fluid inlet 170 of the fluid mover 160 in 410. A second portion 250 of the warm fluid can be drafted into the fluid mover 160 via a second fluid inlet 180 in 420. The warm fluid can be expelled or discharged 260 from the fluid mover 160 in 430.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

While the foregoing is directed to embodiments of the present invention, other and further embodiments of the invention may be devised without departing from the basic scope thereof, and the scope thereof is determined by the claims that follow.

We claim the following:

1. A thermal distribution system, comprising:
   a first surface having a plurality of perforations and a fluid inlet opening formed therein;
   a second surface spaced from the first surface to form a void therebetween, the second surface comprising at least a portion of an electronic enclosure;
   a perimeter surface extended from at least a portion of a perimeter of the first surface to the second surface; and
   a fluid mover disposed proximate the fluid inlet opening to draw fluid warmed by at least one heat producing component disposed at least partially within the electronic enclosure into the void via the plurality of perforations, the fluid mover comprising a first fluid inlet disposed proximate the fluid inlet opening to draw a first portion of the warmed fluid from inside the void through the fluid inlet opening and into the fluid mover via the first fluid inlet, and a second fluid inlet to draw a second portion of the warmed fluid from outside the void into the fluid mover via the second fluid inlet.

2. The system of claim 1, wherein the first surface comprises a material having a thermal conductivity of not less than 1 watt/centimeter-Kelvin (W/cm-K).

3. The system of claim 1, wherein the first surface comprises a planar perforated surface.

4. The system of claim 1, wherein the electronic enclosure comprises a portable computing device enclosure and the fluid mover comprises a centrifugal fan.

5. The system of claim 1, wherein the at least one heat producing component is disposed proximate the first surface.

6. A thermal distribution method, comprising:
   reducing the pressure within a void formed by disposing at least a portion of a perimeter of a first surface proximate a second surface;
   wherein the first surface comprises a plurality of perforations;
   wherein the second surface comprises at least a portion of an electronic enclosure;
   warming a fluid flowing about a heat producing component disposed at least partially within the electronic enclosure;
   drafting at least a portion of the warm fluid into the void via the plurality of perforations;

drafting a first portion of the warm fluid from the void through a fluid inlet opening formed in the first surface via a fluid mover disposed proximate the fluid inlet opening;

drafting the first portion of the warm fluid from the void into the fluid mover via a first fluid inlet of the fluid mover; and drafting a second portion of the warm fluid into the fluid mover via a second fluid inlet of the fluid mover.

7. The method of claim 6, further comprising:

establishing a laminar flow within the void using at least a portion of the warm fluid drafted into the void via the plurality of perforations.

8. The method of claim 6, further comprising:

expelling at least a portion of the warm fluid from the electronic enclosure using the fluid mover.

9. The method of claim 6, further comprising:

conveying at least a portion of the heat provided by the heat generating component using the first surface;

wherein the first surface comprises a material having a thermal conductivity of at least 1 watt/centimeter-Kelvin.

10. A thermal distribution system, comprising:

a first surface comprising a rectangular planar surface having a perimeter;

wherein at least a portion of the perimeter of the first surface is disposed at an angle of about 90 degrees from the plane formed by the first surface;

a plurality of perforations formed through and disposed about the rectangular planar surface;

a fluid inlet opening formed through the rectangular planar surface;

a second surface comprising at least a portion of an electronic enclosure;

wherein at least a portion of the perimeter of the first surface is disposed proximate the second surface, forming a void therebetween;

at least one heat producing component disposed at least partially within the electronic enclosure proximate the first surface;

a fluid mover disposed proximate the fluid inlet opening to draw fluid warmed by the at least one heat producing component into the void via the plurality of perforations;

wherein a first fluid inlet to the fluid mover is disposed proximate the fluid inlet opening and is adapted to draw a first portion of the warmed fluid from inside the void through the fluid inlet opening and into the fluid mover via the first fluid inlet; and wherein a second fluid inlet to the fluid mover is adapted to draw a second portion of the warmed fluid from outside the void into the fluid mover via the second fluid inlet.

11. The system of claim 10, wherein the first surface comprises a material having a thermal conductivity of not less than 1 watt/centimeter-Kelvin.

12. The system of claim 10, wherein the electronic enclosure comprises a portable computing device enclosure and the fluid mover comprises a centrifugal fan.

13. The system of claim 1, wherein the fluid mover is disposed on a first side of the first surface and is to draw fluid from the first side of the first surface through the plurality of perforations to a second side of the first surface through the void and through the fluid inlet opening back to the first side of the first surface.

14. The system of claim 13, further wherein the fluid mover is to draw fluid directly from the first side of the first surface.

15. The method of claim 6, wherein drafting at least a portion of the warm fluid into the void via the plurality of perforations and drafting a first portion of the warm fluid from the void through the fluid inlet opening comprises drafting fluid from a first side of the first surface through the plurality of perforations to a second side of the first surface through the void and through the fluid inlet opening back to the first side of the first surface.

16. The method of claim 15, further comprising drafting fluid directly from the first side of the first surface.

17. The system of claim 10, wherein the fluid mover is disposed on a first side of the first surface and is adapted to draw fluid from the first side of the first surface through the plurality of perforations to a second side of the first surface through the void and through the fluid inlet opening back to the first side of the first surface, and adapted to draw fluid directly from the first side of the first surface.

* * * * *